US012737707B2

(12) United States Patent
Gutermuth et al.

(10) Patent No.: US 12,737,707 B2
(45) Date of Patent: Sep. 15, 2026

(54) METHOD FOR A PLANT OPERATION OPTIMIZATION COMPONENT

(71) Applicant: ABB Schweiz AG, Baden (CH)

(72) Inventors: Georg Gutermuth, Heidelberg (DE); Bernhard Primas, Mannheim (DE); Matthias Biskoping, Hirschberg (DE); Matthias Schloeder, Heidelberg (DE); Arzam Muzaffar Kotriwala, Ladenburg (DE)

(73) Assignee: ABB Schweiz AG, Baden (CH)

( * ) Notice: Subject to any disclaimer, the term of this patent is extended or adjusted under 35 U.S.C. 154(b) by 58 days.

(21) Appl. No.: 18/672,552

(22) Filed: May 23, 2024

(65) Prior Publication Data

US 2024/0394633 A1 Nov. 28, 2024

(30) Foreign Application Priority Data

May 26, 2023 (EP) .................................... 23175810

(51) Int. Cl.
*G06Q 10/0633* (2023.01)
*G06Q 50/04* (2012.01)

(52) U.S. Cl.
CPC ......... *G06Q 10/0633* (2013.01); *G06Q 50/04* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 5,924,486 A * | 7/1999 | Ehlers | F24F 11/62 | 165/238 |
| 8,359,124 B2 * | 1/2013 | Zhou | G05B 13/024 | 700/291 |
| 9,626,634 B2 * | 4/2017 | Schroeder | G06F 11/3457 | |
| 9,634,488 B2 * | 4/2017 | Sundaram | G06Q 10/04 | |
| 10,580,094 B1 * | 3/2020 | Haynold | G06Q 50/06 | |
| 2002/0019758 A1 * | 2/2002 | Scarpelli | G06Q 10/06 | 705/1.1 |
| 2004/0068454 A1 * | 4/2004 | Jacobus | G06Q 10/087 | 705/36 R |
| 2008/0243310 A1 * | 10/2008 | Esposito | G05B 13/042 | 700/268 |
| 2010/0198423 A1 * | 8/2010 | Hirst | G06Q 30/0206 | 700/297 |
| 2011/0106328 A1 * | 5/2011 | Zhou | G05B 13/024 | 700/291 |

(Continued)

FOREIGN PATENT DOCUMENTS

EP 0688085 A1 12/1995

OTHER PUBLICATIONS

Jeon, Hyun Woo, Seokgi Lee, and Chao Wang. "Estimating manufacturing electricity costs by simulating dependence between production parameters." Robotics and Computer-Integrated Manufacturing 55 (2019): 129-140. (Year: 2019).*

(Continued)

*Primary Examiner* — Alan S Miller
(74) *Attorney, Agent, or Firm* — Fitch Even Tabin & Flannery LLP

(57) ABSTRACT

A computer-implemented method for a plant operation optimization component includes determining optimal operation set points and, based on optimal operation set points and corresponding operational costs, providing output allowing for selecting a tariff.

13 Claims, 4 Drawing Sheets

(56) References Cited

U.S. PATENT DOCUMENTS

| | | | | |
|---|---|---|---|---|
| 2012/0303412 | A1* | 11/2012 | Etzioni | G06Q 30/06<br>705/7.31 |
| 2013/0060394 | A1* | 3/2013 | Jones | G06Q 50/06<br>713/320 |
| 2013/0144451 | A1* | 6/2013 | Kumar | G05B 15/02<br>700/291 |
| 2014/0031999 | A1* | 1/2014 | Oe | G06Q 50/06<br>700/291 |
| 2014/0324532 | A1* | 10/2014 | Ghosh | G06Q 30/0202<br>705/7.31 |
| 2016/0291554 | A1* | 10/2016 | Hong | H02J 3/003 |
| 2020/0193346 | A1* | 6/2020 | Elbsat | G06Q 10/06313 |
| 2023/0418346 | A1* | 12/2023 | Matthews | G06Q 50/06 |

OTHER PUBLICATIONS

Beier, Jan, Sebastian Thiede, and Christoph Herrmann. "Integrating variable renewable electricity supply into manufacturing systems." Eco-factories of the future. Cham: Springer International Publishing, 2018. 17-40. (Year: 2018).*

Holtewert, Philipp, and Thomas Bauernhansl. "Optimal configuration of manufacturing cells for high flexibility and cost reduction by component substitution." Procedia CIRP 41 (2016): 111-116. (Year: 2016).*

Mitra, Sumit, et al. "Optimal production planning under time-sensitive electricity prices for continuous power-intensive processes." Computers & Chemical Engineering 38 (2012): 171-184. (Year: 2012).*

Shrouf, Fadi, et al. "Optimizing the production scheduling of a single machine to minimize total energy consumption costs." Journal of Cleaner Production 67 (2014): 197-207. (Year: 2014).*

Cano et al., "Impact of Different Tariffs on the Optimal Sizing and Operation of a Household with PV, Storage and Electric Vehicle," *2021 IEEE PES Innovative Smart Grid Technologies Conference-Latin America* (*ISGT Latin America*), 5 pp. (Sep. 15-17, 2021).

European Patent Office, Extended European Search Report in European Patent Application No. 23175810.3, 7 pp. (Nov. 21, 2023).

* cited by examiner

METHOD FOR A PLANT OPERATION OPTIMIZATION COMPONENT

CROSS-REFERENCE TO RELATED APPLICATIONS

The instant application claims priority to European Patent Application No. 23175810.3, filed May 26, 2023, which is incorporated herein in its entirety by reference.

FIELD OF THE DISCLOSURE

The present disclosure generally relates to a computer-implemented method for a plant operation optimization component.

BACKGROUND OF THE INVENTION

Operation of plants, particularly the components thereof, is generally subject to plant operation optimization. Dedicated components for such an optimization may be used. As an example, such components carry out optimizations to obtain operation set points at which to ideally operate the plant components under given conditions. Such an optimization may be towards overall cost reduction, for example.

However, the optimization components are limited in their functionality due to being specialized for determining set point for plant operation. Thus, it is an object of the present invention to provide a method for plant operation optimization component allowing for extending functionality without impeding the main functionality.

BRIEF SUMMARY OF THE INVENTION

In a general aspect, the present disclosure describes a method, system, computer program product, and computer-readable medium for a plant operation optimization component. The method comprises determining, based on a current tariff and a technical plant configuration, optimal operation set points and corresponding operational costs associated with the current tariff. The method further comprises receiving a candidate tariff that is different from the current tariff. The method further comprises modifying the candidate tariff so as to obtain a modified candidate tariff by changing a value of a variable of a plurality of variables characterizing the candidate tariff and determining, based on the modified candidate tariff and the technical plant configuration, optimal operation set points and corresponding operational costs associated with the modified candidate tariff.

The method further comprises determining whether the operational costs associated with the modified candidate tariff meet a target criterion. The method further comprises in response to determining that the target criterion is not met, repeating the modifying of the candidate tariff until the target criterion is met. The method further comprises in response to determining that the target criterion is met, providing an output allowing for selecting a new current tariff and for determining corresponding operation set points. The modified candidate tariff for which the target criterion is met is a final modified candidate tariff.

The output comprises at least one of: the final modified candidate tariff, the value of the variable associated with the final modified candidate tariff, one or more tariff selection criteria determined based on the final modified candidate tariff and/or the value of the variable associated with the final modified candidate tariff.

The target criterion is: that the operational costs associated with the modified candidate tariff equal the operational costs associated with the current tariff, or that the operational costs associated with the modified candidate tariff are within a predetermined range relative to the operational costs associated with the current tariff the range comprising the costs associated with the current tariff and values smaller than the costs associated with the current tariff or the range comprising only values smaller than the costs associated with the current tariff, or that the operational costs associated with the modified candidate tariff are lower than the operational costs associated with the current tariff by a predetermined amount.

In other words, the invention provides a method that allows for utilizing components that are specifically dedicated for determining operation set points for a plant and its constituent components. These components take into account how a plant is configured. For example, the technical configuration of a plant may entail the loads of the plant and their characteristics. For example, each load may be characterized by operation characteristics, e.g., a set point range, efficiency at different set points, or the like. Moreover, operation of each load may depend on the overall plant operation requirements, e.g., a load may not be required to operate at all times or may operate at different set points, potentially associated with different operation efficiency, according to overall plant operation requirements. The overall plant operation requirements may be time dependent, e.g., based on a time-dependent demand to be met by operating the plant. Moreover, some plants may have energy storage that allows for some flexibility in terms of consuming external energy, e.g., from a grid. Making use of energy storage is also associated with a certain cost.

BRIEF DESCRIPTION OF THE SEVERAL VIEWS OF THE DRAWING(S)

Figure 4:
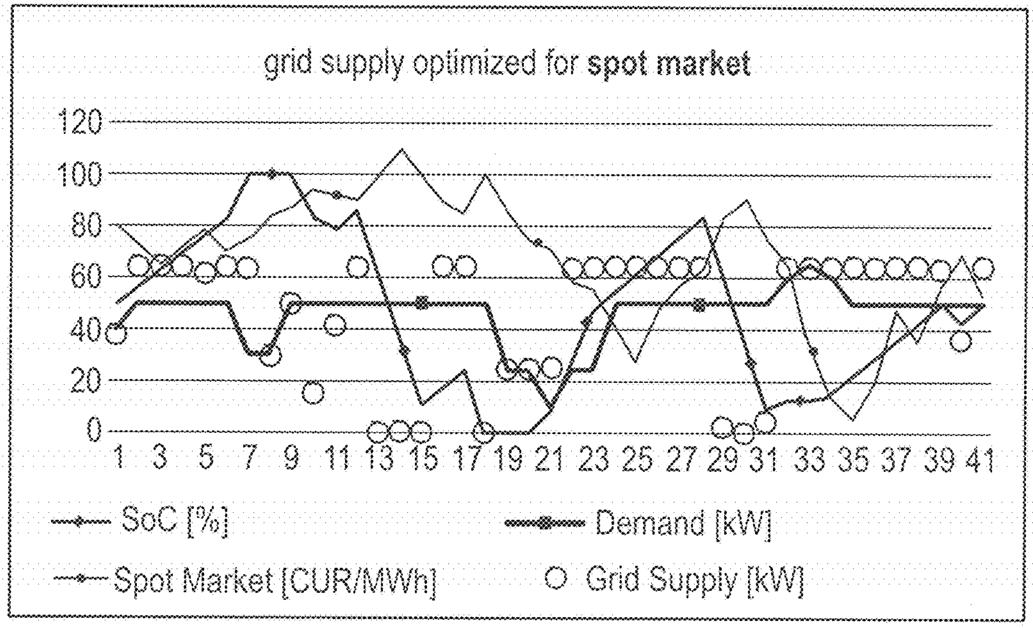
Figure 5:
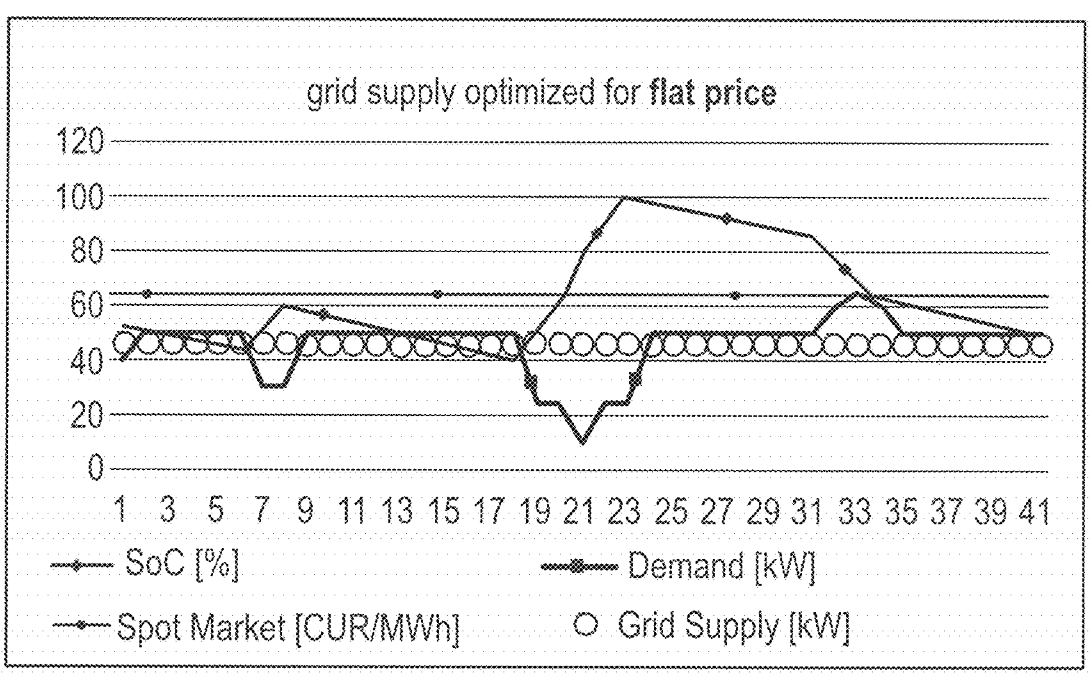
Figure 6:
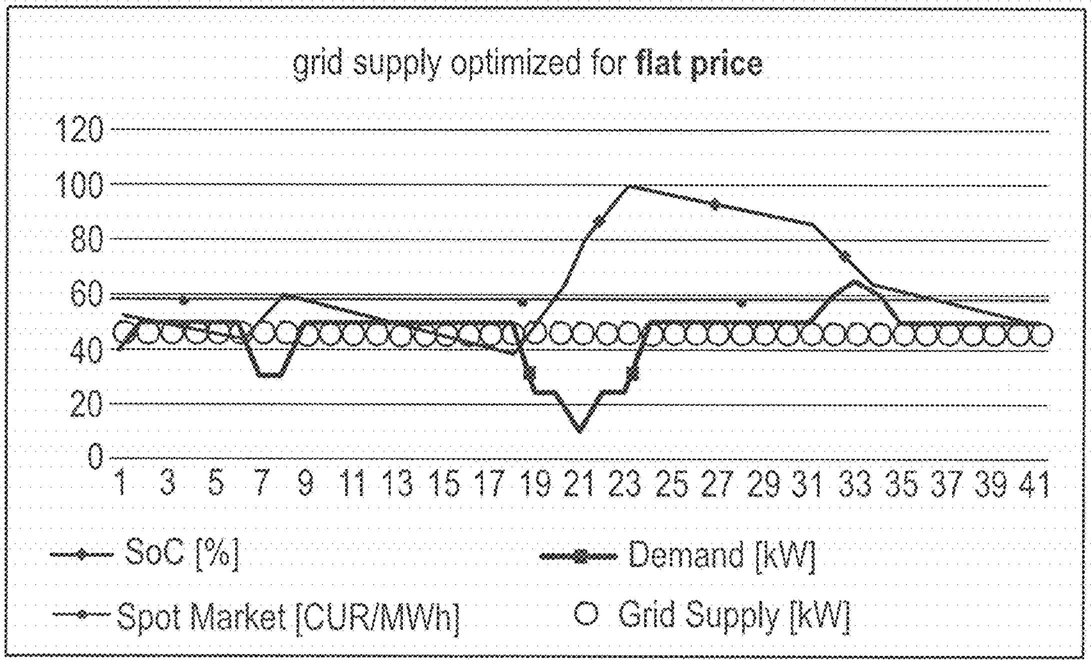

FIGS. 4, 5, and 6 are schematic illustrations of a power demand, energy price, state of charge, and energy intake for different scenarios, in accordance with the disclosure.

Figure 7:
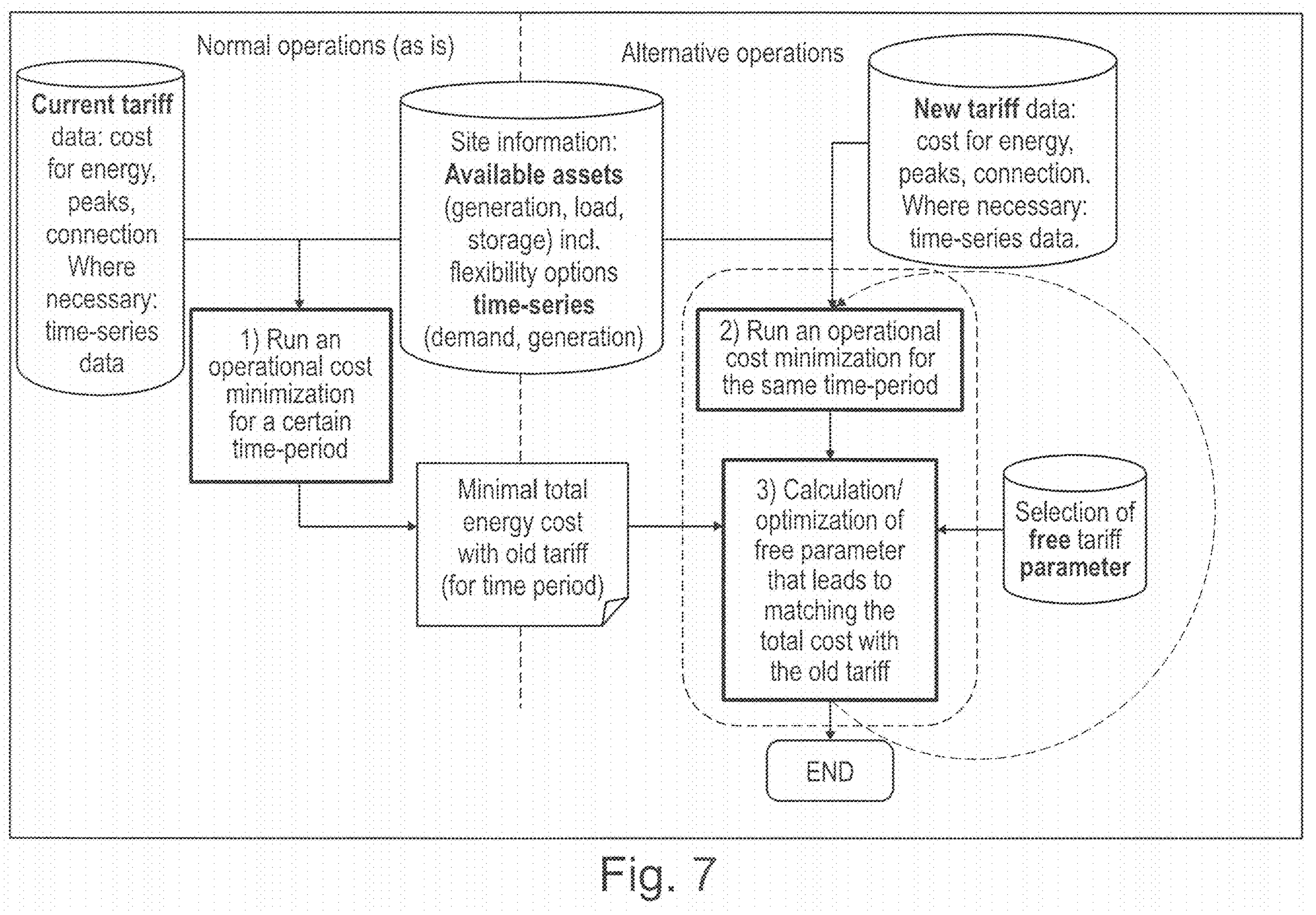

FIG. 7 is a flowchart of a method according to the present disclosure.

DETAILED DESCRIPTION OF THE INVENTION

Figures 1, 2:
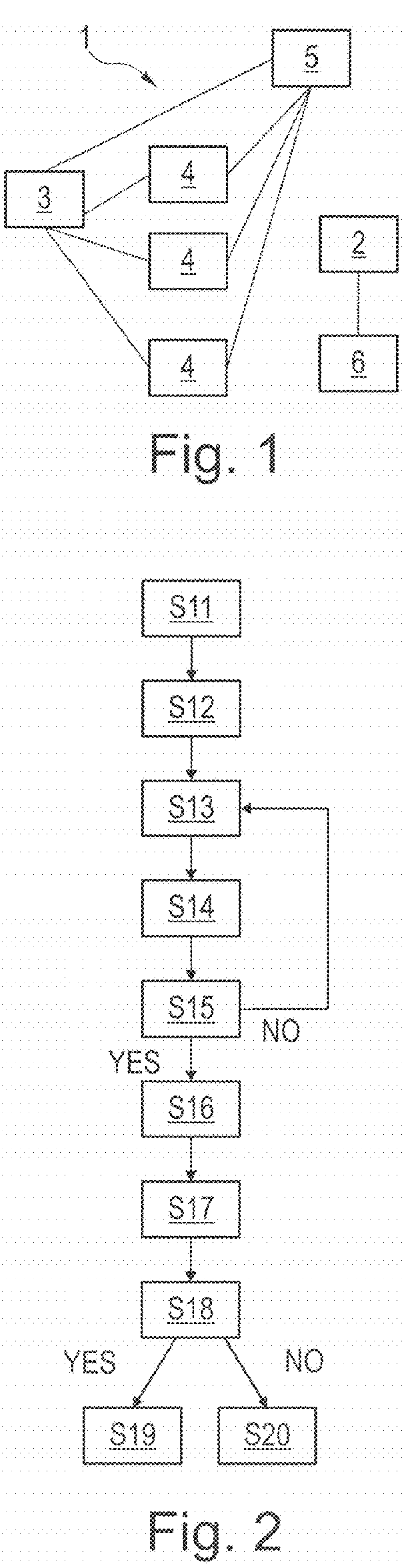
FIG. 1 is a schematic representation of a system according to the present disclosure.
FIG. 2 is a flowchart for a method according to the present disclosure.

FIG. 1 illustrates a system 1 comprising a plant operation optimization component, the system having a data processing system 2 (also referred to as computing system) configured to carry out the method of the present disclosure, specifically as outlined below in the context of FIGS. 2 to 7 or in the claims. In particular, the data processing system 2 may be configured to run/execute the plant operation optimization component, e.g. in a centralized or distributed manner.

As shown in the example shown in FIG. 1, the system may optionally comprise plant components 4, for example loads to be supplied with energy, and an optional energy storage 5. An output component 6 configured for providing the output allowing for selecting a new current tariff and for determining corresponding operation set points is shown in FIG. 1. The output may be separate from or formed integrally with the data processing system.

It is noted that operation of the components, at least for some components and some operation modes, will be co-dependent and/or dependent on use or non-use of energy from the energy storage. Reference sign 3 illustrates a grid from which electricity is received. The grid, in this example, is not part of the system.

A method for a plant operation optimization component according to the present disclosure is illustrated in FIG. 2. Known plant operation optimization components may be used, which are generally configured for determining plant operation parameters, such as set points, based on an optimization procedure, which, for example, aims at minimal operational costs given a certain energy tariff. Such plant operation optimization components take into account technical plant configuration, which may entail the number of components of the plant, their respective characteristics, co-dependencies in their operation, or the like. To take into account the complexity of plants, particularly due to the co-dependencies, very specialized optimization components are generally employed. It is noted that the optimization will yield significantly different set points depending on specifics of the energy tariff, for example whether the energy price is fixed or variable over time and/or whether and how much high peak power consumption is penalized.

The method comprises, in step S11, determining, based on a current tariff and a technical plant configuration, optimal operation set points and corresponding operational costs associated with the current tariff. As explained above, the technical plant configuration may comprise, among others, a number and characteristics of plant components, and their co-dependencies. The current tariff may include an energy price, which may be fixed or variable and, in case of a variable energy price, may have a predetermined or a non-predictable variability. The current tariff may also include a peak power price. From this information, the optimization component determines optimal operation set points. The corresponding operational costs associated with the tariff may be retrieved based on a simulation or historic operations, based on the determined operation set points and the current tariff. For example, a model may model the plant operation dependent on operation set points, and may determine the resulting operation costs for a given tariff. The result of step S11 may be considered to be a reference operational cost value.

The method comprises, in step S12, receiving a candidate tariff that is different from the current tariff. For example, the candidate tariff may have flat energy price rather than an energy price that is variable over time. The values of parameters of the candidate tariff may, in principle, be freely chosen. This is because the candidate tariff is only a guess for a starting point from which modification steps to the candidate tariff are carried out. In one embodiment, values for all except one remain the same. In the example of switching from variable to fixed energy price, only the value of the energy price may change from the variable values to a fixed value. This fixed value may be selected freely. A potential starting point for the fixed value is a mean energy price calculated for the variable energy price.

The method comprises, in step S13, modifying the candidate tariff so as to obtain a modified candidate tariff by changing a value of a variable of a plurality of variables characterizing the candidate tariff. Specifically, a value of one or more, in a preferred embodiment exactly one, free parameter may be changed. For example, the above-described flat energy price value used in the candidate tariff of step S12 as a starting point, may now be modified. The modification may be selected in different manners. In some cases, the modification may be more straightforward than in other cases.

The method comprises, in step S14, determining, based on the modified candidate tariff and the technical plant configuration, optimal operation set points and corresponding operational costs associated with the modified candidate tariff. This step may be similar to the determination step above, particularly be based on carrying out optimization. In more straightforward cases, for example where modification simply shifts the overall cost structure, it may not be necessary to carry out a new optimization, but rather the optimal operation set points and costs from the non-modified candidate tariff may be directly used to derive operational costs associated with modified candidate tariff.

The method comprises, in step S15, determining whether the operational costs associated with the modified candidate tariff meet a target criterion. The target criterion, according to the present disclosure may be that the operational costs associated with the modified candidate tariff equal the operational costs associated with the current tariff. That is, the target is to keep the overall costs the same when changing the tariff. When setting this target criterion, a breakeven value can be determined indicating the value above or below which a potential new tariff is better or worse in terms of overall costs than the current tariff.

The target criterion may, alternatively, be that the operational costs associated with the modified candidate tariff are within a predetermined range relative to the operational costs associated with the current tariff, the range comprising the costs associated with the current tariff and values smaller than the costs associated with the current tariff or the range comprising only values smaller than the costs associated with the current tariff. That is, it may not be necessary to arrive at the overall costs of the current tariff or any other target value for the overall costs precisely. There may also be a range of acceptable costs. The range may be around and include the current overall costs, or it may include the current overall costs and lower costs, or it may be entirely lower than the current overall costs.

Yet alternatively, the target criterion may be that the operational costs associated with the modified candidate tariff are lower than the operational costs associated with the current tariff by a predetermined amount. That is, rather than looking for a breakeven point relative to the current overall costs, a lower value for the overall costs may be used and a breakeven point may be determined with respect to said lower value. This allows for also looking for saving costs, rather than just keeping costs the same.

As mentioned above, in some cases, the modification of the candidate tariff may be more straightforward than in other cases. Accordingly, in some cases the modifying may already be carried out in such a manner as to ensure that the target criterion will be met. That is, the modifying may directly lead to the target criterion. However, in less straightforward cases, it may not be possible to identify, in advance, which modification might lead to meeting the target criterion. This is also due to the nature of the operational optimizers, which may not inherently support such a feature. In said less straightforward cases, the modification might, thus, not necessarily lead to meeting the target criterion.

Steps S14 and S15 evaluate the effect of the modification of the modifying of the candidate tariff by identifying the costs of the modified candidate tariff and by checking whether a target criterion is met. For example, the determination may check whether the overall operational costs of the modified candidate tariff equal the operational costs identified in step S11 for the current tariff. Thus, it can be determined whether modifying the candidate tariff yielded the break-even value for the modified variable.

The method comprises, in response to determining that the target criterion is not met, repeating the modifying of the candidate tariff until the target criterion is met, as indicated by the arrow in the flow chart, indicating that the method reverts to step S13. That is, iterations of modifying the candidate tariff may be carried out as long as the target criterion is not met. Optionally, an abortion criterion may be used for terminating the method, for example to address cases where the iterations do not lead to a converging result, e.g., in case the target criterion is not met after a predetermined number of iterations or after a predetermined time.

The method comprises, in step S16, in response to determining that the target criterion is met, providing an output allowing for selecting a new current tariff and for determining corresponding operation set points. Optionally, steps S13 to S15 may be carried out repeatedly, each repetition for a single one of the variables, optionally while keeping the values obtained from the previous repetition(s) unchanged. Thus, different variables can be examined individually.

Step S16 may entail outputting the value of the variable that had been modified when modifying the candidate tariff for which the target criterion was met, for example, a break-even value for a variable, where the overall costs of the modified tariff equal the overall costs of the modified candidate tariff.

According to the present disclosure, the modified candidate tariff for which the target criterion is met is a final modified candidate tariff. The output may comprise the final modified candidate tariff, i.e., values for all variable characterizing the tariff, or only one or some of the values of the variables associated with the final modified candidate tariff, particularly only the value for variables having changed in the course of the modifying, i.e., free variable. The output may alternatively or in addition comprise one or more tariff selection criteria determined based on the final modified candidate tariff and/or the value of the variable associated with the final modified candidate tariff. That is, instead of directly outputting the final modified candidate tariff and/or the value of the variable associated with the final modified candidate tariff, the tariff selection criteria may be derived therefrom, and the selection criteria may be output.

The method may also comprise the optional step of receiving, in step S17, a proposed new tariff and, in step S18, determining whether the proposed new tariff meets the selection criteria. The method may comprise approving, in step S19, selection of the proposed new tariff as current tariff if this is the case and otherwise disapproving, in step S20, selection of the proposed new tariff. In other words, the output of step S16 may be used for evaluating any proposed new tariff as to whether it should be selected or not. As the target criterion (e.g. maintain costs or reduce costs) is already reflected in the output due to steps S14 to S16, so decision-making is straightforward and does not require any simulation to be run for the proposed new tariff. Instead, only the selection criteria have to be checked. In the simplest case, for example, the value of the variable that had been modified when modifying the candidate tariff for which the target criterion was met, for example, a break-even value for a variable. The selection criterion may be that selection of a new tariff is approved in case the value of the same variable or corresponding variable of the new tariff is the same as or exceeds or remains below the value obtained in the modifying procedure.

Thus, it can be understood that a complex problem can be addressed by means of existing technology, i.e., the operational optimization, so as to yield simple selection criteria.

The method of the present disclosure may be performed in a system as shown in FIG. 1, the method steps, for example, being carried out by the processing system 2, or any other suitable system, particular a system according to the present disclosure.

Examples for methods according to the present disclosure are provided below. In the following examples, further aspects of the method of the present disclosure will be outlined. These are mere examples, and the present invention is not limited to these examples.

Figure 3:
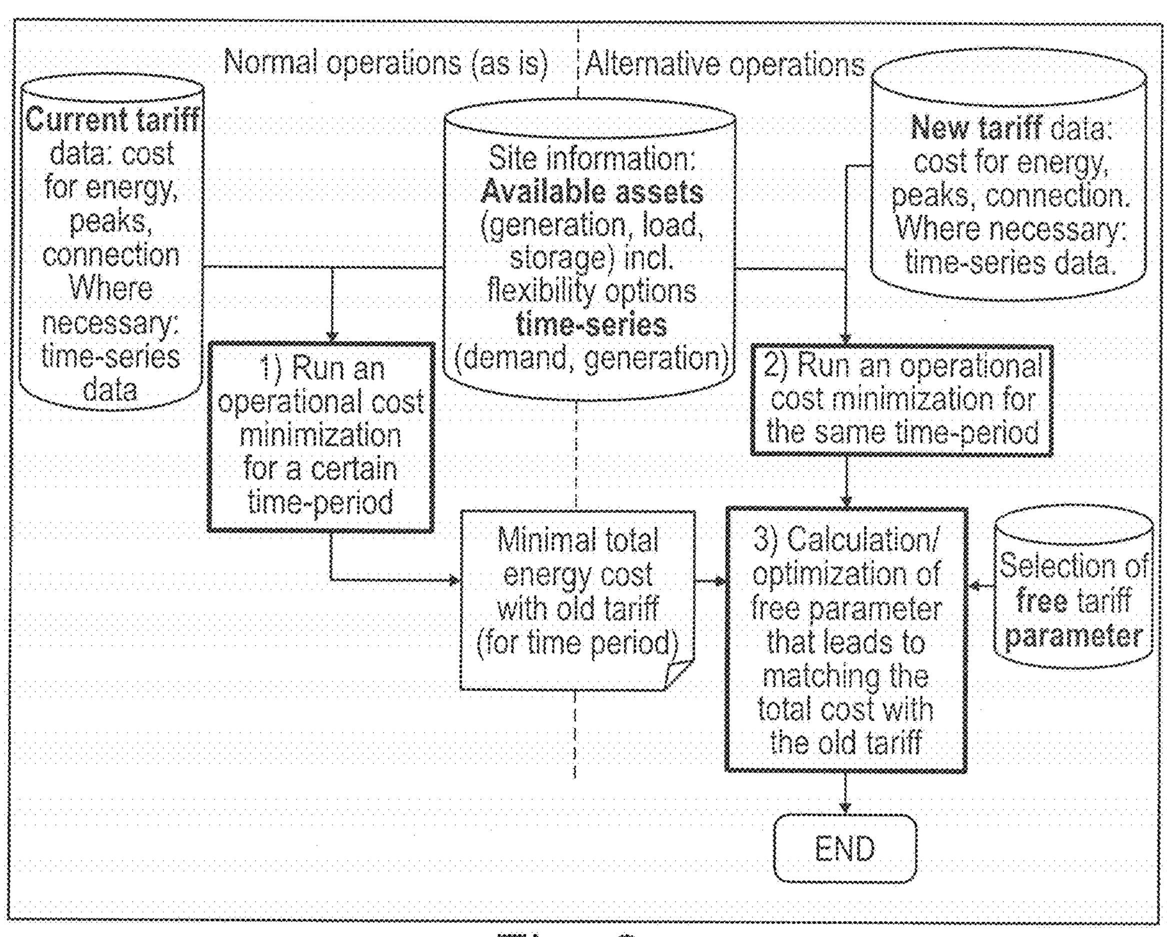
FIG. 3 is a flowchart for a method according to the present disclosure.

A method according to the present disclosure is shown in FIG. 3. It comprises three steps that are explained with the help of a concrete example, which is, however, not to be considered to be limiting. The number values have only exemplary character, and the money values are given in arbitrary currency [CUR]. Data employed in the method are current tariff data, such as cost for energy, peaks, connection, and/or time-series data and also site information data, such as available assets including generation, load, and storage, flexibility options, and time series data, e.g. on demand and generation, or the like. The data may be used to run an operational cost minimization for a certain time-period in step 1, yielding a minimal total energy cost with the current (also referred to as "old") tariff for a given time-period. A similar operational cost minimization is run for a candidate tariff (here referred to as "new" tariff) as shown in step 2. The results of step 1 and step 2 are used for determining a value of a free tariff parameter, for example in such a manner as to match the total costs for the new tariff to the total costs of the old tariff. The result may be output, e.g. as a break-even value. Step 3 may receive input as to which parameter is to be used as free tariff parameter.

FIGS. 4, 5, and 6 each shows two input curves (power demand and energy price) as well as two optimized curves (energy intake and a state-of-charge), each for a different scenario. Specifically, in FIG. 4, a current tariff having a spot market energy price is considered. The energy intake and the state-of-charge result are a result of the total cost optimization obtained as described below or, e.g., by step S11 above. FIG. 6 shows a scenario after switching from a spot market to a flat energy price, i.e., after step 2 below. It becomes immediately apparent that the curves yielded by the optimization are entirely different, also reflecting that the optimization yields different set points for a different energy tariff. For example, optimization here, no longer having to account for variability in energy price, may now have more freedom to arrive at set points reducing power peaks, as becomes apparent from the flat line for the energy intake. FIG. 5 shows a scenario for the break-even point, i.e., where the total costs match those of the current tariff is shown, i.e., after step 3 below.

The following steps may, thus, be carried out. The Step numbers refer to FIGS. 3 and 7 respectively. Step 1: Obtain real/original cost for current tariff and example time-horizon: The example site is (only) powered by grid electricity, to fulfill a given demand curve shown in FIG. 4, in this example in a time-interval of 41 time-steps. Additionally, the site includes an energy storage (e.g., BESS) that can have an energy content (SoC=state of charge) between 0% and 100%.

Merely for illustration, the following (existing) power tariff is assumed: Energy Cost: Spot market curve in CUR/MWhel (exemplary average value of 67.7 CUR/MWh).

Power Cost: 500 CUR/KW times Pmax, which is the highest grid-supply power value [kW] measured in the selected time period. Base Cost: None Step 1 now determines, among others and using plant operation optimization, the optimal operation strategy, including the grid-supply and the usage of the energy storage to minimize the overall electrical costs. The result is shown in FIG. 4 and results in the following exemplary numbers:

| Current tariff example | unit | spot market |
|---|---|---|
| optimized E-cost | CUR/MWh | 59.3 |
| E-cost | CUR | 112302 |
| optimized Power peak | kW | 64.2 |
| Peak power cost | CUR | 32107 |
| Total cost | CUR | 144409 |

The following can be observed: Energy: The energy intake from the grid is low with high spot market prices and instead the BESS is unloaded and filled again at times with low prices. Making optimum use of the energy storage (BESS) leads to an average energy price of 59.3 CUR/MWh, instead of 67.7 CUR/MWh. Power: The aim of minimization of the power peak was taken into account as well, as reflected here by the maximum power value of 64.2 kW. Cost: The total cost for the time-interval is 144409 CUR as the sum of energy cost (78%) and power cost (22%).

Step 2: Optimize hypothetic cost for same example, but a candidate tariff (changed compared to the current tariff). Assuming an overall goal is to switch to a fixed energy cost tariff, for simplicity, in this example with the same power cost (500 CUR/KW). All assets and parameters are also kept identical to Step1, except for the Energy Cost, that is now fixed to a constant value. This constant value may be selected arbitrarily, yet in this example it is set at, 59.3 CUR/MWh, which was the average energy cost of the current tariff in Step 1. With those parameters, the operation optimization, e.g. entailing the grid-intake and energy storage operation, is run to find the minimum total cost. The result is shown in FIG. 6 and the following table.

| Candidate tariff example | unit | Flat price (minimized) |
|---|---|---|
| optimized E-cost | CUR/MWh | 59.3 |
| E-cost | CUR | 112302 |
| optimized P | kW | 46.4 |
| P-cost | CUR | 23194 |
| Total cost | CUR | 135496 |

The following can be observed: Energy: The energy cost is constant, as the flat energy price was chosen the same as the average value of step 1. Power: As the degrees of freedom are not used any more to minimize the average energy cost of a volatile spot market, they can be used to minimize the peak power value and thus the power cost. The result is a lowered peak value of 46.4 kW (compared to 64.2 kW) leading to reduced power costs. Cost: The total cost for the time-interval is reduced to 135496, which reflects, in this example, the reduction of the power cost.

Step 3: Modify candidate tariff, specifically a flexible tariff parameter, to match the original total energy cost. As the total energy cost after step 2 was reduced, it is possible to adjust a flexible tariff parameter, here as an example the energy price, to match the total cost as determined for the current tariff. In the present example, this can be achieved by increasing the energy cost from 59.3 to 64.0 CUR/MWh.

The result is shown in FIG. 5 and the following table.

| Modified tariff example | unit | flat price (optimized) |
|---|---|---|
| optimized E-cost | CUR/MWh | 64.0 |
| E-cost | CUR | 121214 |
| optimized P | kW | 46.4 |
| P-cost | CUR | 23194 |
| Total cost | CUR | 144409 |

The result is an optimized operational strategy minimizing the power peak (here to 46.4) and maximizing the constant energy cost parameter (here to 64.0), so as to exactly match the original total cost in Step 1 of 144409 CUR. As such, a break-even value is obtained for the constant energy cost parameter in the present example. This allows for determining that a tariff with energy cost parameter below 64.0 will lead to a reduced total energy cost This can be used for making a tariff selection decision. In the above example, the calculation in Step 3 is quite simple. This might not always be the case.

Alternatives to said calculation in Step 3, indicated by dashed lines in FIG. 7, are provided below: Iterate steps 2 and 3: Starting the next iteration by taking the flat energy price of 64.0 CUR/MWh and again minimizing total cost as described in Step 2. This iteration can be continued until no changes in the parameters occur anymore. This method will be beneficial if set point choices differ between steps 2 and 3. This is indicated by the dashed circle to the right in FIG. 7.

Joint optimization: Steps 2 and 3 may, in some cases, be formulated in a closed optimization problem that finds a parameter (here, for example, the flat energy price) to match the original total cost (in contrast to minimizing total cost), while minimizing the power peak parameter. This is indicated by the box around steps 2 and 3 in FIG. 7. This mechanism that has been described for finding the constant break-even energy price, can be used in the same fashion to determine other parameters, with the most common ones being: Energy cost: Spot-market, time-of-use, constant/flat tariff; Peak costs: None, exceeding limit value, maximum peak in a certain time-interval (e.g. month, year); Base price: Fixed amount (e.g., for connection and/or metering) or flexible price depending on consumption.

The method of the present disclosure can also be applied to various other parameters, like e.g. a $CO_2$ content associated with the power. As seen above, an aspect according to the present disclosure involves a method that allows for determining a break-even parameter value for a new tariff compared to an existing one. Alternatively or in addition to a break-even, the present method may be carried out with the goal to achieve a given saving, e.g. 5% of total energy cost. The method of the present disclosure may involve running optimized operational calculations on time-series data. The method of the present disclosure may involve running the method on arbitrary time-intervals of the past (historic data) or the future (forecasted time-series).

As will be understood from the above, a method is provided that allows to at least one obtain parameter value of a new energy tariff that leads to a “break even total costs” in comparison with the current/existing tariff. This is done by operational optimization calculations on time-series data, with variation of one parameter to reach the breakeven total cost. Facilities, Campuses, or Industrial Sites are large conglomerates of multi-energy streams (electricity, gas, heat) with energy consumers, grid connections and potentially different options for energy generation. The total energy bill can make up a large portion of the annual operational costs. To reduce the energy costs there are two options: one is changing the consumption pattern and the second one is changing the energy tariff. However, consumption pattern and energy tariff are closely interwoven, and a tariff may have multiple components contributing in different ways to the overall costs, again closely linked with the consumption pattern. A changed energy tariff might entirely change an optimized consumption pattern as obtained by operation optimization. Accordingly, it is challenging to optimize operational costs and the present disclosure allows to address this challenge.

As an example, as seen above, the present disclosure may calculate tariff-parameter values that lead to a break-even or cost reduction. The method may determine a tariff parameter set that would, based on historic or forecasted patterns, result in the same energy cost as the current tariff or in a target cost reduction. Thus, based on only one parameter value, a break-even value, it can be determined whether a candidate tariff is more favorable than the current tariff in terms of overall costs. This can be done for arbitrary time intervals in the past and/or in the future, e.g. using forecast estimates.

As mentioned above, an iterative method may be carried out. An example for such an iterative method is provided below for arriving at a break-even value. A candidate tariff (new possible tariff) is a time-of-use (ToU) tariff with daytime (e.g. 7:00-19:00) having a certain cost (e.g. 70 €/MWh) and nighttime (e.g. 19:00-7:00) having a certain cost (e.g. 50 €/MWh). A first step simulates the new (operationally optimized) annual costs with these values. In the present example, the costs may now be 20% higher than the previous costs. In a second step, the candidate tariff is modified, e.g., both tariff components (day and night) are reduced by 20%, and another (operation-optimized) simulation is run. In a third step, the simulation may now yield different operating points, so that now the costs are 5% lower than the previous costs. In this example, different operating points may be yielded, for example, because energy storage may no longer be as profitable, since the spread was reduced from 70-50=20 to 56−40=16 in step 1). In a fourth step, the candidate tariff is modified again, e.g. both tariff components (day and night) may now be increased by 5% and another (operationally optimized) simulation is run. The candidate tariff may be modified repeatedly until the break-even value is found. Here, an iteration was necessary because the modifications resulted in different operating points being chosen, thereby making the exact result of the modification unpredictable.

Plant operation optimization components are generally configured for taking technical characteristics like the ones described above as input and carrying out optimization to obtain operation set points yielding minimal operational costs, optionally within certain boundary conditions. In order to obtain the costs, the plant operation optimization components also receive the values characterizing the current tariff as input, as this allows for the optimization to also take into account the tariff in the cost optimization.

The type of tariff, for otherwise unchanged demand, technical characteristics, and boundary conditions, may yield entirely different optimization results for the set points. For example, in some cases it may depend on the tariff whether to consume energy from the grid or from an energy storage at a given time, where the energy price is time-dependent, or where the tariff entails an increased price for power consumption peaks. This also illustrates that the effect of a changed tariff on the overall costs may not be immediately apparent, as even a slightly changed tariff might entirely change the optimization results.

The above-described plant operation optimization components will often already be deployed and customized for a given plant. Moreover, they are highly specialized for the above-described purpose.

However, at present, these highly specialized components cannot help at all in tariff optimization or selection, which essentially also takes away an additional aspect for the optimization. That is, at present the components are configured such that the energy tariff can only be used as an input for the optimization of the operation, which will then output operation set points.

The present invention allows for extending the functionality of said existing plant operation optimization components by providing the claimed method. The plant operation optimization, as such, need not be interfered with, such that existing plant operation optimization components can be extended rather than having to be exchanged or having their core functionality modified, which avoids deterioration of the functionality and/or high costs associated with exchanging them or modifying the core functionality. Moreover, the method of the present disclosure is compatible with any of the existing plant optimization components, so any existing plant optimization components can be retrofitted with the extended functionality.

The extended functionality provided by the invention is a decision-support for deciding whether to select a new tariff, which, as explained above, is generally not straightforward in view of the interdependency of the tariff parameters and the optimization. Moreover, optimized operation set points can then be provided for operation with a newly selected tariff.

As such, an additional optimization dimension for operation of the plant is opened up and the technical functionality of the existing components is extended. Below, the features of the present invention will be explained in more detail. As mentioned above, the method of the present disclosure is a method for a plant operation optimization component. In other words, the method is to be carried out by a plant operation optimization component, e.g. as explained above, specifically a pre-existing plant operation optimization component. The method of the present disclosure allows to provide additional functionality for such components without replacing them or modifying their core functionality.

For example, the plant operation optimization component may comprise an optimization engine taking, as input, technical plant characteristics and pricing, like the costs for grid energy, peak power or for energy retrieved from energy storage. As mentioned above, the method comprises determining, based on a current tariff and a technical plant configuration, optimal operation set points and corresponding operational costs associated with the current tariff. A tariff, according to the present disclosure, may be characterized by several parameters, for example an energy price, a peak power price, base price, or the like. A tariff may be in one of multiple categories, for example, a variable energy price tariff, for example market-dependent and/or time-dependent, or a fixed energy price tariff. Tariff parameters may also comprise parameters representative prices associated with gas, heat, water, or the like, consumed and/or output by plant operation and/or associated with emissions associated with plant operation. The current tariff, according to the present disclosure, may be the tariff with which the plant is currently being operated.

The technical plant configuration, according to the present disclosure, may comprise the plant components, such as loads, energy storage, energy sources, or the like, of the plant and their characteristics, for example their respective energy consumption at a given set point, output at a given set point, and/or operation efficiency at a given set point. Operational costs may be derivable from these characteristics when taking into account the current tariff. That is, taking certain set points and the current tariff as input, operational costs can be determined.

In the present disclosure optimal operation set points may be set points that are obtained by optimizing operational costs. The corresponding operational costs, i.e. corresponding to the optimal operation set points, associated with the current tariff are those operational costs that are calculated taking the optimized operational costs and the current tariff, e.g., pricing values, as input.

As such, it will be understood that operational costs are closely related to the technical configuration of the plant, not just the tariff. Thus, for example, the same tariff may yield entirely different costs depending on plant configuration and/or operation. As mentioned above, the method further comprises receiving a candidate tariff that is different from the current tariff. The tariff being different may entail that it differs in the value of at least one variable characterizing the tariff. The tariff being different may entail that the tariff is in a different category, e.g. a different type of tariff, for example a fixed energy price tariff as opposed to a variable energy price tariff. This scenario may mean that in one case the variable "energy price" has a fixed value. In case of a variable energy price tariff, the variable "energy price" may be a function of time, which, for the sake of simplicity, will also be referred to as having a different value from the fixed energy price in the following, even if the function may at some moment in time have the value of the fixed energy price.

The candidate tariff may be obtained in any manner, it serves as starting point for an optionally iterative, method to arrive at a final modified candidate tariff that meets a certain criterion. As such, it does not need to fulfill any particular requirements. However, for example where the modified candidate tariff is a fixed energy price tariff and the current tariff is a variable energy price tariff, a value for the fixed energy price that is derived from the variable energy price may be selected, for example a mean energy price determined from a historical development of the variable energy price. This may improve efficiency for arriving at the final modified candidate tariff.

As mentioned above, the method further comprises modifying the candidate tariff so as to obtain a modified candidate tariff by changing a value of a variable of a plurality of variables characterizing the candidate tariff and determining, based on the modified candidate tariff and the technical plant configuration, optimal operation set points and corresponding operational costs associated with the modified candidate tariff.

As an example, exactly one value may be changed. For example, the fixed energy price value may be increased or reduced. The variable to be changed may be selected automatically, e.g. in a given order or according to any other given rule, or may be selected based on a user input, for example. The direction of change of the value may be automatically determined. For example, the direction change may be determined by determining, for the candidate tariff and using optimal operation set points determined for the candidate tariff, whether the associated operation costs are higher or lower than the operation costs for the current tariff. As an example, if the operation costs associated with the candidate tariff are lower than those of the current tariff, the value of an energy price might be increased. The direction may also be predetermined or selected randomly. As will be seen below, due to the possibility for iterations, even modifying the candidate tariff in an unfavorable direction will eventually lead to the desired outcome, even if potentially after more iterations.

In particular, modifying the candidate tariff may comprise changing the value of exactly one of the variables. As will be seen below, subsequently other variables might also be changed and the method may similarly be applied for said other variables, optionally while keeping the previously determined value(s) for other variable(s) fixed. Thus, values for variables can be sequentially obtained, which reduces complexity of calculations and may be particularly easy to incorporate into the existing optimization component. Alternatively, the values of two or more variables may be changed at once. This allows an immediate tradeoff between their values, for example.

The above step allows for observing changes to the overall costs when changing values characterizing the candidate tariff. As mentioned above, the method further comprises determining whether the operational costs associated with the modified candidate tariff meet a target criterion. For example, using the optimal set points obtained for the modified candidate tariff and the values characterizing the tariff as an input, the operational costs associated with the modified candidate tariff may be obtained. The determining whether a target criterion is met may allow for determining whether the modified candidate tariff requires further modification or not. As will be explained in detail below, such a criterion may be that the operational costs associated with the modified candidate tariff have a predetermined relation to the operational costs of the current tariff, for example, equals or essentially equals the operational costs associated with current tariff or yields a predetermined saving relative to the current tariff.

As mentioned above, the method further comprises in response to determining that the target criterion is not met, repeating the modifying of the candidate tariff until the target criterion is met. For example, when it is determined that the operational costs associated with the modified candidate tariff are not equal to the current operational costs or do not provide predetermined savings, the candidate tariff may be modified again in a similar manner described above. Optionally, the method may comprise determining whether the previous modification led towards or away from the target criterion, i.e., whether the modified candidate tariff yields better results than the candidate tariff in terms of meeting the target criterion. If it is determined that the modified candidate tariff yields better results, the direction of a repeated modification may be the same as the previous one, otherwise, the direction of the repeated modification may be opposite to the previous one. Thus, iteratively, the modified candidate tariff may be further modified until the target criterion is met.

As mentioned above, the modified candidate tariff for which the target criterion is met is referred to as the final modified candidate tariff. It is to be understood that where the above method is subsequently carried out for multiple variables, the final modified candidate tariff may be the one obtained after repeating the above steps for all of said multiple variables. As mentioned above, the method further comprises in response to determining that the target criterion is met, providing an output allowing for selecting a new current tariff and for determining corresponding operation set points. The output allowing for selecting a new current tariff may entail that the output comprises one or more tariff selection criteria. The output may be provided in such a manner as to allow for automatic selection of a new current tariff, e.g., in the form of a rule or a threshold value for use in an automatic determination method, and/or as a user output, e.g. in the form of a visualization of a rule or threshold value on a display, allowing for user selection.

The output may also only comprise the final modified tariff and/or one or more values for a variable characterizing the final modified tariff, which value(s) may indicate break-even points, for example.

The output allowing for determining corresponding operation set points, i.e., operation set points corresponding to the new current tariff. That is, the output may be configured to allow for being input into the plant operation optimization component and used for determining optimal operation set points. This allows for operating the plant at said optimal operation set point after selecting a given tariff as the new current tariff. Selecting a new current tariff may entail determining, for a given tariff, whether (the) one or more tariff selection criteria are met, and if so, confirming selection and otherwise rejecting selection of the given tariff as new current tariff.

As mentioned above, the output comprises at least one of: the final modified candidate tariff, the value of the variable associated with the final modified candidate tariff, one or more tariff selection criteria determined based on the final modified candidate tariff and/or the value of the variable associated with the final modified candidate tariff. It is to be understood that where the above steps were carried out for multiple variables, the output may comprise the values for all of said multiple variables associated with the final modified candidate tariff and/or tariff selection criteria associated therewith. Tariff selection criteria may comprise threshold values and/or selection rules, e.g. associated with the threshold values. For example, a selection rule may entail that selection of a given tariff will only be confirmed where a threshold value is exceeded.

As mentioned above, the target criterion for determining whether or not to repeat modification of the candidate tariff may be that the operational costs associated with the modified candidate tariff equal the operational costs associated with the current tariff. This means that the method will arrive at a final modified candidate tariff that represents, for the modified variable(s), the value where the costs are the same as those for the current tariff, i.e., where a breakeven point is reached. In this case, the output described above may yield a threshold that marks from which value of a variable the costs can be reduced.

For example, this might be particularly advantageous for switching between a fixed energy price tariff and a variable energy price tariff, as the straightforward assumption that the costs might be the same where the mean energy price of the variable energy price tariff equals the fixed energy price of the fixed energy price tariff will generally not be correct due to the underlying optimization based on the technical plant configuration.

Alternatively, the target criterion for determining whether or not to repeat modification of the candidate tariff may be that the operational costs associated with the modified candidate tariff are within a predetermined range relative to the operational costs associated with the current tariff the range comprising the costs associated with the current tariff and values smaller than the costs associated with the current tariff or the range comprising only values smaller than the costs associated with the current tariff.

That is, the target criterion might be that the new costs be approximately, the approximately being defined by the size of the predetermined range, the same as the current costs or to approximately, the approximately being defined by the size of the predetermined range, a predetermined saving relative to the current costs.

Yet alternatively, the target criterion for determining whether or not to repeat modification of the candidate tariff may be that the operational costs associated with the modified candidate tariff are lower than the operational costs associated with the current tariff by a predetermined amount. That is, the target criterion might be to meet a predetermined target cost reduction. In this case, the output described above may yield a threshold that marks from which value of a variable the at least the predetermined cost reduction is achieved.

Accordingly, the present disclosure provides a method that significantly increases the functionality of existing plant operation optimization components making ideal use of their core functionality of providing optimal operation set points.

Optionally, the method may comprise a step of determining whether the candidate tariff, prior to modification, meets the target criterion and, if this is the case, determining that the candidate tariff is the final modified candidate tariff, and otherwise proceeding with modifying the candidate tariff. That is, where the selected candidate tariff already, for example by chance, meets the target criterion, no modification may be required. In this case, the method might optionally include, automatically or prompted by a user, setting a different, for example more ambitious, target criterion and/or modifying the candidate tariff so as to meet other optimization goals, for example to make an optimization towards specific costs associated with one of the variables.

According to the present disclosure, the method may further comprise determining, based on the candidate tariff and the technical plant configuration, optimal operation set points and corresponding operational costs associated with the candidate tariff. The method may only directly proceed with the modifying of the candidate tariff if it is determined that the operational costs associated with the candidate tariff are lower than the operational costs associated with the current tariff by a predetermined amount, and otherwise proceed with the modifying of the candidate tariff only upon confirmation by a user and/or proceeds with the modifying of a different candidate tariff and/or terminates.

That is, a rule may be set up that serves as an indicator whether the costs associated with a candidate tariff has a high risk of increasing overall costs, irrespective of modifications. For example, this might be the case where the candidate tariff, for the technical configuration of the plant at hand, would be entirely unsuitable. An extreme example might be a plant that inevitably has a lot of consumption peaks and does not have its own energy storage. A tariff having high penalties for consumption peaks may be unsuitable for such a plant configuration, irrespective of whether or not the values of other variables are modified.

The above step allows for handling such a situation. For example, the method might terminate to avoid being stuck in a loop. Continuing the method by modifying the candidate tariff may require user confirmation, which would allow for a user to evaluate whether to take the risk of the method getting stuck. The method might also proceed with selecting a different candidate tariff on which to perform the subsequent modification. In the above example, this might be a candidate tariff that does not penalize consumption peaks.

Particularly where the method does not comprise the above step, it may be advantageous to have a termination criterion that interrupts the method when stuck in a loop of modifying the candidate tariff and/or a warning criterion triggering output of a warning to a user when the method is stuck in a loop of modifying the candidate tariff.

According to the present disclosure, the method may further comprise that the modifying is carried out for exactly one of the plurality of variables while keeping the value of the remaining variables of the plurality of variables fixed.

As briefly mentioned above, this may reduce computational complexity. Moreover, in some cases a selection criterion for a candidate tariff may only relate to one of the variables, in which case it is sufficient to keep the remaining variables fixed. As also mentioned above, it is possible to subsequently carry out the steps for different variables individually while keeping the other variables fixed.

According to the present disclosure, the method may further comprise that the modifying is carried out for two or more of the plurality of variables while keeping the value of the remaining variables of the plurality of variables fixed, wherein the same target criterion or different target criteria are used for the two or more of the plurality of variables.

Such a method may allow for tradeoffs between the two or more variables in the method. It may be computationally more complex, but might possible explore a larger space of potential values for the two or more variables than, e.g., carrying out subsequent individual modifications.

According to the present disclosure, the one or more tariff selection criteria may comprise a threshold value, the threshold value corresponding to or being determined based on the value of the variable associated with the final modified candidate tariff.

As explained above the final modified candidate tariff may yield values for one or more variables associated therewith. Said values, particularly the values of one or more variables that were changed when modifying the candidate tariff, may be used as threshold value(s) or to derive therefrom threshold value(s) to be used as selection criterion. For example, selection of a given tariff may depend on whether or not such a threshold is exceeded.

According to the present disclosure, the threshold value(s) mentioned above may signify a breakeven value for the variable associated with the final modified candidate tariff. That is, a value of a variable, such as a price, of the final modified candidate tariff may signify a threshold from which on a tariff might yield lower costs than the current tariff.

According to the present disclosure, variables characterizing a tariff may comprise at least one of: a flat energy price, a peak energy price, a peak power price, a mean energy price.

A flat energy price may refer to the energy price not being variable, e.g., not being time dependent and/or market-dependent. A peak energy price may refer to a price associated with energy consumption peaks, such as where energy consumption exceeds a certain threshold. Similarly, a peak power price may refer to a price associated with a power consumption peak, such as where power consumption exceeds a certain threshold. A mean energy price may be a statistical mean calculated for a given period of time for a time-variable energy price. This may be suitable as a starting point when comparing a fixed energy price tariff and a variable energy price tariff.

According to the present disclosure, the technical plant configuration may comprise plant component characteristics of components of the plant, such as loads like EV-charging stations, (flexible) loads or sector coupling elements like electric heater, electrolyzer modules, combined heat and power or the like and optionally at least one of: presence of energy storage, characteristics of energy storage, load characteristics for loads, and optionally presence of hydrogen storage or characteristics of hydrogen storage.

Characteristics of the components may include set point-dependent efficiency, set point-dependent energy consumption, set-point dependent wear of a component, availability of energy in an energy storage, availability of remaining storage capability of an energy storage, efficiency associated with energy storage, or the like.

According to the present disclosure, the determining of optimal operation set points may be carried out for time-series data for a selected time interval, and/or for a selected demand curve, particularly for the selected time-interval, and/or historic data, particularly for the selected time interval, and/or forecasted data.

For example, time-series data may comprise, using operational data, for example respective inputs and outputs of components of the plant and their energy consumption, throughout the selected time interval. The time-series data may be historic data. Optimization may also be run on the basis of a selected demand curve, e.g., demand curves one might expect for the plant, which may be used alternatively or in addition to time-series data. Alternatively or in addition, forecasted data may be used, e.g., based on models modelling plant operation, for determining optimal operation set points. Known optimization methods may be employed to used said data and the tariff data, e.g., energy and power pricing, so as to optimize operation set points in terms of cost.

According to the present disclosure, the determining of optimal operation set points may be carried out for the current tariff, the modified candidate tariff, and optionally the modified candidate tariff for the same conditions and the same time interval. That is, the method may rely upon keeping other parameters that might influence the optimization fixed, such as technical configuration of the plant, time interval for which the optimization is carried out, or (other) boundary conditions for the optimization. This allows for reliable comparison between the different tariffs and providing meaningful selection criteria.

According to the present disclosure, the current tariff and the candidate tariff may be of different tariff types and/or the candidate tariff and the modified candidate tariff may be of the same tariff type, wherein the tariff type may be fixed energy price or variable energy price, particularly time-variable energy price and/or market-dependent-variable energy price.

As explained above, different tariff times, such as fixed energy price or variable energy price tariffs may lead to entirely different optimization results, i.e., entirely different optimal operation set points. Accordingly, where the current tariff and the candidate tariff are of different tariff types, the present method has a very important role, as it is not readily recognizable how the operation costs differ between the two. Moreover, for the modifying of the present disclosure, it may be advantageous to not modify the tariff type as such, i.e., to have a candidate tariff and a modified candidate tariff of the same tariff type. Particularly in case of iteratively finding the final modified candidate tariff, this will allow for faster convergence.

The method may entail repeating the entire method for candidate tariffs of different tariff types, while within the modification steps keeping the candidate tariff type the same. This allows for providing selection criteria for different tariff types independently, for each type in an efficient manner.

According to the present disclosure, the current tariff may be a variable energy price type tariff, and the candidate tariff may be a fixed energy price type tariff having a fixed energy price corresponding to the mean energy price of the current tariff.

As briefly mentioned above, a starting point for values of variable of the candidate tariff may, in principle, be selected freely. For a current tariff of variable energy price type and a candidate tariff of fixed energy price type, in case the energy price is the variable to modified when modifying the candidate tariff, the mean energy price of the current tariff may represent an efficient starting point, potentially decreasing the number of iterations.

According to the present disclosure, the modifying of the candidate tariff may comprise carrying out an optimization problem finding a value for the variable of the plurality of variables characterizing the candidate tariff for which value the operational costs associated with the modified candidate tariff meet the target criterion while minimizing cost associated with another variable of the plurality of variables characterizing the candidate tariff.

For example, the variable and the other variable may be a fixed energy price and a peak power price.

As an example, it may be desirable to minimize costs associated with peak power. For example, where several value pairs of the variable and the other variable may lead to meeting the target criterion, costs associated with one said variables may be minimized. It may be desirable for different reasons to distribute costs between different variables in a certain way. For example, it may be desirable to reduce costs associated with peak power.

The method of the present disclosure may comprise receiving a proposed new tariff, determining whether the proposed new tariff meets the selection criteria, and approving selection of the proposed new tariff as current tariff if this is the case and otherwise disapproving selection of the proposed new tariff.

This may be carried out fully automatically. For example, as explained above, selection criteria may entail whether threshold values derived from the final modified tariff are exceeded. One or more selection criteria may be used.

The invention also provides a system comprising a plant operation optimization component, wherein the system comprises a data processing system configured to carry out any of the methods of the present disclosure. The plant operation optimization component may be executed by the data processing system, in particular in a centralized manner or in a distributed manner. The system may comprise plant components, such as loads, the plant components having characteristics that contribute to the technical plant configuration. For example, the system may comprise, as loads, electrolyzer modules and may optionally comprise a hydrogen storage system.

It is noted that in the present disclosure, the plant operation optimization component may be implemented on one device or on multiple devices, for example in a distributed system. That is, the term "component" in this context is not to be understood as being limited to a physical unit.

The system may comprise an energy storage system, such as BESS (battery electric storage system).

The invention also provides a computer program product comprising instructions which, when the program is executed by a computer, cause the computer to carry out any of the methods of the present disclosure.

The invention also provides a computer-readable medium comprising instructions which, when executed by a computer, cause the computer to carry out any of the methods of the present disclosure.

The features and advantages outlined above in the context of the method similarly apply to the system, the computer program product, and the computer-readable medium described herein.

Further features, examples, and advantages will become apparent from the detailed description making reference to the accompanying drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for a plant operation optimization component, the method comprising:

determining optimal operation set points and corresponding operational costs associated with the current tariff based on a current tariff and a technical plant configuration, wherein the technical plant configuration comprises plant component characteristics including the presence of an energy storage device and load characteristics;

receiving a candidate tariff that is different from the current tariff;

modifying the candidate tariff to obtain a modified candidate tariff by changing a value of a variable of a plurality of variables characterizing the candidate tariff and determining optimal operation set points and corresponding operational costs associated with the modified candidate tariff based on the modified candidate tariff and the technical plant configuration, wherein the modifying of the candidate tariff comprises carrying out an optimization problem finding a value for the variable of the plurality of variables characterizing the candidate tariff for which value the operational costs associated with the modified candidate tariff meet a target criterion while minimizing cost associated with another variable of the plurality of variables characterizing the candidate tariff;

determining whether the operational costs associated with the modified candidate tariff meet the target criterion;

when determining that the target criterion is not met, repeating the modifying of the candidate tariff until the target criterion is met;

when determining that the target criterion is met, providing an output allowing for selecting a new current tariff and for determining corresponding operation set points, wherein the modified candidate tariff for which the target criterion is met is a final modified candidate tariff, wherein the output comprises at least one of: the final modified candidate tariff, the value of the variable associated with the final modified candidate tariff, one or more tariff selection criteria determined based on the final modified candidate tariff and/or the value of the variable associated with the final modified candidate tariff, and wherein an operation of the energy storage device is adjusted to shift energy consumption according to the final modified candidate tariff, and wherein the target criterion is that the operational costs associated with the modified candidate tariff equal the operational costs associated with the current tariff, or that the operational costs associated with the modified candidate tariff are within a predetermined range relative to the operational costs associated with the current tariff the range comprising the costs associated with the current tariff and values smaller than the costs associated with the current tariff or the range comprising only values smaller than the costs associated with the current tariff, or that the operational costs associated with the modified candidate tariff are lower than the operational costs associated with the current tariff by a predetermined amount.

2. The method of claim 1, wherein the method further comprises:

determining optimal operation set points and corresponding operational costs associated with the candidate tariff based on the candidate tariff and the technical plant configuration, wherein the method only directly proceeds with the modifying of the candidate tariff when it is determined that the operational costs associated with the candidate tariff are lower than the operational costs associated with the current tariff by a predetermined amount, and otherwise proceeds with the modifying of the candidate tariff only upon confirmation by a user and/or proceeds with the modifying of a different candidate tariff and/or terminates.

3. The method of claim 1, wherein modifying is carried out for exactly one of the plurality of variables while keeping the value of the remaining variables of the plurality of variables fixed.

4. The method of claim 1, wherein modifying is carried out for two or more of the plurality of variables while keeping the value of the remaining variables of the plurality of variables fixed, wherein the same target criterion or different target criteria are used for the two or more of the plurality of variables.

5. The method of claim 1, wherein the one or more tariff selection criteria comprises a threshold value, the threshold value corresponding to or being determined based on the value of the variable associated with the final modified candidate tariff.

6. The method of claim 1, wherein the threshold value signifies a breakeven value for the variable associated with the final modified candidate tariff.

7. The method of claim 1, wherein variables characterizing a tariff comprise at least one of: a flat energy price, a peak energy price, a peak power price, a mean energy price.

8. The method of claim 1, wherein the technical plant configuration further comprises presence of hydrogen storage or characteristics of hydrogen storage.

9. The method of claim 1, wherein the determining of optimal operation set points is carried out for time-series data for a selected time interval, and/or for a selected demand curve, and/or historic data.

10. The method of claim 1, wherein the determining of the optimal operation set points is carried out for the current tariff, the modified candidate tariff, and the modified candidate tariff is carried out for the same conditions and time interval.

11. The method of claim 1, wherein the current tariff and the candidate tariff are of different tariff types and/or wherein the candidate tariff and the modified candidate tariff are of the same tariff type, wherein the tariff type may be fixed energy price or variable energy price.

12. The method of claim 11, wherein the current tariff is a variable energy price type tariff, and the candidate tariff is a fixed energy price type tariff having a fixed energy price corresponding to the mean energy price of the current tariff.

13. The method of claim 1, wherein the method comprises receiving a proposed new tariff, determining whether the proposed new tariff meets the selection criteria, and approving selection of the proposed new tariff as current tariff when this is the case and otherwise disapproving selection of the proposed new tariff.

* * * * *